United States Patent

[11] 3,564,346

[72] Inventor Carl E. Atkins
Montclair, N.J.
[21] Appl. No. 743,066
[22] Filed July 8, 1968
[45] Patented Feb. 16, 1971
[73] Assignee Wager Electric Corporation
a corporation of Delaware

[54] CONTROL CIRCUIT
17 Claims, 5 Drawing Figs.

[52] U.S. Cl. .......... 317/142, 317/146, 317/148.5; 307/116, 307/255, 307/293, 307/308
[51] Int. Cl. .......... H01h 47/22, H01h 47/32
[50] Field of Search .......... 317/146; 317/137

[56] References Cited
UNITED STATES PATENTS

| | | | |
|---|---|---|---|
| 3,199,033 | 8/1965 | Atkins et al. | 328/5 |
| 3,382,408 | 5/1968 | Atkins | 317/146X |
| 3,435,298 | 3/1969 | Atkins et al. | 317/146 |

*Primary Examiner*—Lee T. Hix
*Assistant Examiner*—C. L. Yates
*Attorney*—Eyre, Mann & Lucas

ABSTRACT: A first switch (solid-state or electromagnetic) controls energization and deenergization of a timing circuit which controls the state of a second switch (solid-state) connected in a current path shunting the winding of a load controlling relay. When a predetermined input is provided to the first switch, a capacitor is charged and upon removal of said predetermined input from the first switch, the capacitor discharges and renders the second switch nonconductive, thereby causing the load controlling relay to become energized for a predetermined, variable period of time. A greater part of the discharging period is usable because the firing signal to the second switch is reduced during discharging of the capacitor. In one embodiment, the first switch is maintained conductive during energization of the load by a signal derived from the high side of the load. In another embodiment, the second switch is energized during charging of the capacitor, but a current-limiting resistor is connected in series with the load until the capacitor begins discharging.

INVENTOR.
CARL E. ATKINS
BY Eyre, Mann & Lucas
ATTORNEYS

INVENTOR.
CARL E. ATKINS
BY Eyre, Mann & Lucas
ATTORNEYS

PATENTED FEB 16 1971

3,564,346

INVENTOR.
CARL E. ATKINS
BY Eyre, Mann & Lucas
ATTORNEYS

CONTROL CIRCUIT

The present invention relates to control circuitry for providing a variable period of energization of a load after the control circuit, which includes a timing circuit, has sensed a predetermined input signal and the subsequent removal of that signal. More particularly, the invention comprises circuitry which provides a variable period of load energization following the actuation and deactuation of a first switch. The first switch is preferably actuated by a capacitance responsive circuit, but any one of numerous other types of sensing circuits may be employed for that purpose. The circuits described herein have been advantageously employed to control sanitary facilities such as urinals, but may also be used in numerous other applications.

For a better understanding of the present invention and the advantages thereof, the following description of the several embodiments thereof should be read in connection with the accompanying drawings of which:

Figure 1:
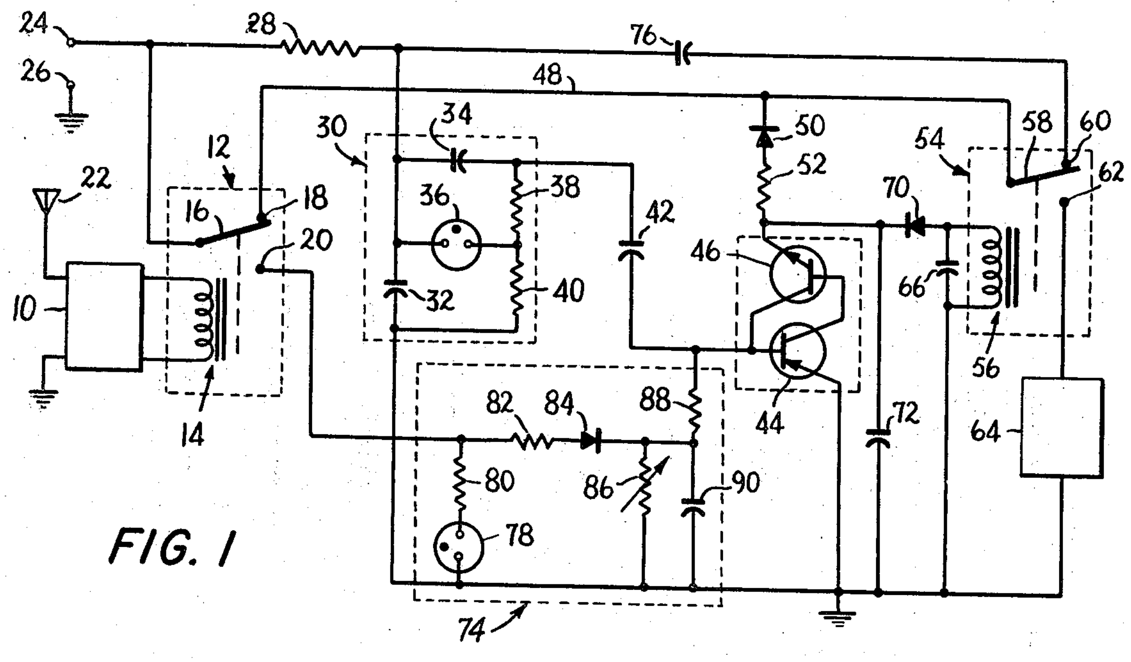
FIG. 1 is a schematic drawing of a circuit constituting one embodiment of the invention in which the firing signal of the second switch is essentially independent of line voltage.

Referring now to FIG. 1, circuit 10 controls the energization of relay 12, which comprises winding 14, armature 16 and contacts 18 and 20. Circuit 10 may be of the capacitance-responsive type, such as that disclosed in U.S. Pat. No. 3,199,033 to C. E. Atkins et al. Such a circuit is responsive to variations in the capacitance of antenna 22 to ground. The standard 115 volt 60 hertz power is applied between terminals 24 and 26, the latter being grounded. Power is applied through limiting resistor 28 to relaxation oscillator 30, which is also described in the aforementioned U.S. Pat. No. 3,199,033 to C. E. Atkins et al. The oscillator 30 consists of capacitors 32 and 34, neon tube 36 and resistors 38 and 40. One terminal of the neon tube 36 is connected to the junction of capacitors 32 and 34. The low side of capacitor 34 is connected to the second terminal of resistor 38. The low side of capacitor 32 is connected to the second terminal of resistor 40. The output of the oscillator is fed through blocking capacitor 42 to the base of transistor 44 and to the collector of transistor 46. The complementary transistors 44 and 46 are interconnected in the regenerative feedback configuration, and function as a solid-state switch controlling the flow of current through conductor 48, diode 50 and resistor 52 to ground. The emitter electrodes of transistors 44 and 46 are, respectively, the cathode and anode of the switch, and the base electrode of transistor 44 is the gate electrode. The condition of the switch formed by transistors 44 and 46, that is, conductive or nonconductive, controls the deenergization and energization, respectively, of relay 54. Relay 54 comprises winding 56, armature 58 and contacts 60 and 62, and controls the energization and deenergization of load 64. The winding 56 of relay 54 is shunted by capacitor 66. One terminal of winding 56 of relay 54 is connected to the anode of a diode 70. The cathode of diode 70 is connected to the emitter of transistor 46. Noise filtering capacitor 72 is connected across the emitter of transistor 46 to the emitter of transistor 44. Conductor 48 connects contact 18 of relay 12 to armature 58 of relay 54. Armature 16 of relay 12 is connected to terminal 24. Contact 20 of relay 12 is connected to the timing circuit 74. Contact 60 of relay 54 is connected to the low side of limiting resistor 28 by capacitor 76. The high side of load 64 is connected to contact 62 of relay 54.

The timing circuit 74 comprises neon tube 78 and resistor 80 connected in series between ground and contact 20 of relay 12; resistor 82, diode 84 and variable resistor 86 connected between the high side of resistor 80 and ground; resistor 88 and capacitor 90 connected in series between the base of transistor 44 and ground; and an ohmic connection between the high side of resistor 86 and the high side of capacitor 90.

A preferred set of values for the various components of the circuit shown in FIG. 1 is as follows:

Resistor 28 — 2.2 megohms
Capacitor 32 — 50 picofarads
Capacitor 34 — 50 picofarads
Resistor 38 — 100 ohms
Resistor 40 — 1200 ohms
Capacitor 42 — 0.001 microfarads
Resistor 52 — 8,200 ohms
Capacitor 66 — 250 microfarads
Capacitor 72 — 0.01 microfarads
Capacitor 76 — 50 picofarads
Resistor 80 — 33,000 ohms
Resistor 82 — 330,000 ohms
Resistor 86 — 56,000 to 100,000 ohms
Resistor 88 — 33,000 ohms
Capacitor 90 — 80 microfarads
Transistor 44 — 2N3638
Transistor 46 — 2N3567

Figure 2:
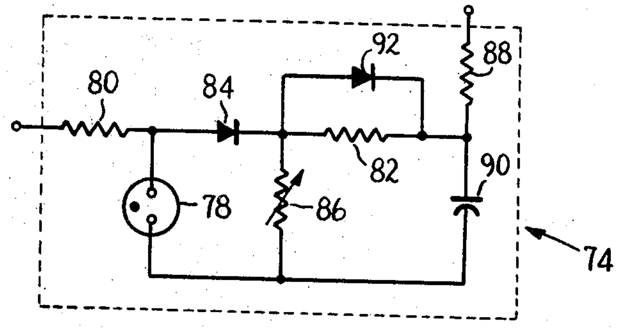
FIG. 2 is a schematic drawing of a circuit constituting a simpler, more economical second embodiment of the invention.

Referring now to FIG. 2, the embodiment described therein is a modification of the embodiment of FIG. 1. Therefore, all similarly numbered parts have the same functions as in FIG. 1. It will be noted that the neon tube 78 and the resistor 80 have been eliminated from the timing circuit and the circuit positions of diode 84 and resistor 82 have been transposed. Resistors 94 and 96 have been added in a series connection between the base of transistor 44 and the terminal 24. Resistor 98 has been added in a series connection between the cathode of diode 50 and conductor 48. Current limiting resistor 28, oscillator 30, and blocking capacitor 42 have all been eliminated. Capacitor 76 has also been eliminated and an ohmic connection is made between contact 60 of relay 54 and the junction of resistors 94 and 96. An ohmic connection is also made between the high side of resistor 96 and the cathode of diode 50. Capacitor 72 has also been eliminated.

A preferred set of values for the various components of the circuit shown in FIG. 2 is as follows:

Resistor 52 — 8,200 ohms
Capacitor 66 — 250 microfarads
Resistor 82 — 220,000 ohms
Resistor 88 — 33,000 ohms
Capacitor 90 — 80 microfarads
Resistor 94 — 680,000 ohms
Resistor 96 — 2.2 megohms
Resistor 98 — 220,000 ohms
Transistor 44 — 2N3638
Transistor 46 — 2N3567

Figure 3:
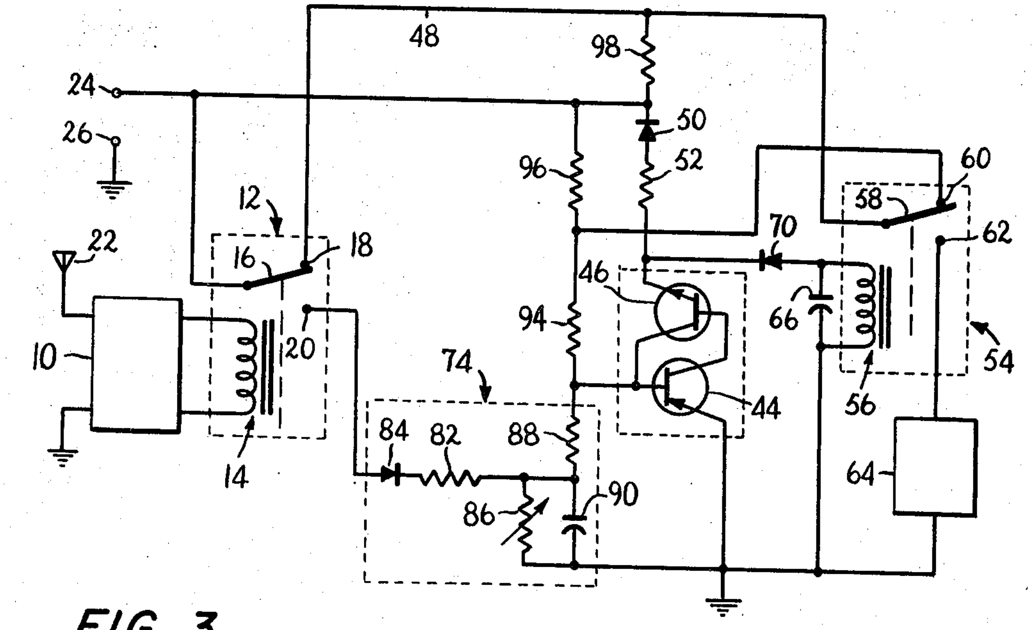
FIG. 3 is a schematic drawing of a variation of the bias storage circuit of FIGS. 1 and 2.

Referring now to FIG. 3, neon tube 78 is connected between ground and one side of resistor 80, the other side of which is connected to contact 20 of relay 12. The anode of diode 84 is connected to the junction of resistor 80 and neon tube 78, and the cathode of diode 84 is connected to the high side of variable resistor 86, the low side of which is connected to ground. The cathode of diode 84 is also connected to the anode of diode 92, which is connected in parallel with resistor 82. The cathode of diode 92 is connected to the junction of resistor 88 and capacitor 90, the latter two elements being connected in series between the base of transistor 44 and ground. The values of the various circuit elements are the same as for the correspondingly numbered elements of the timing circuit of FIG. 1.

Figure 4:
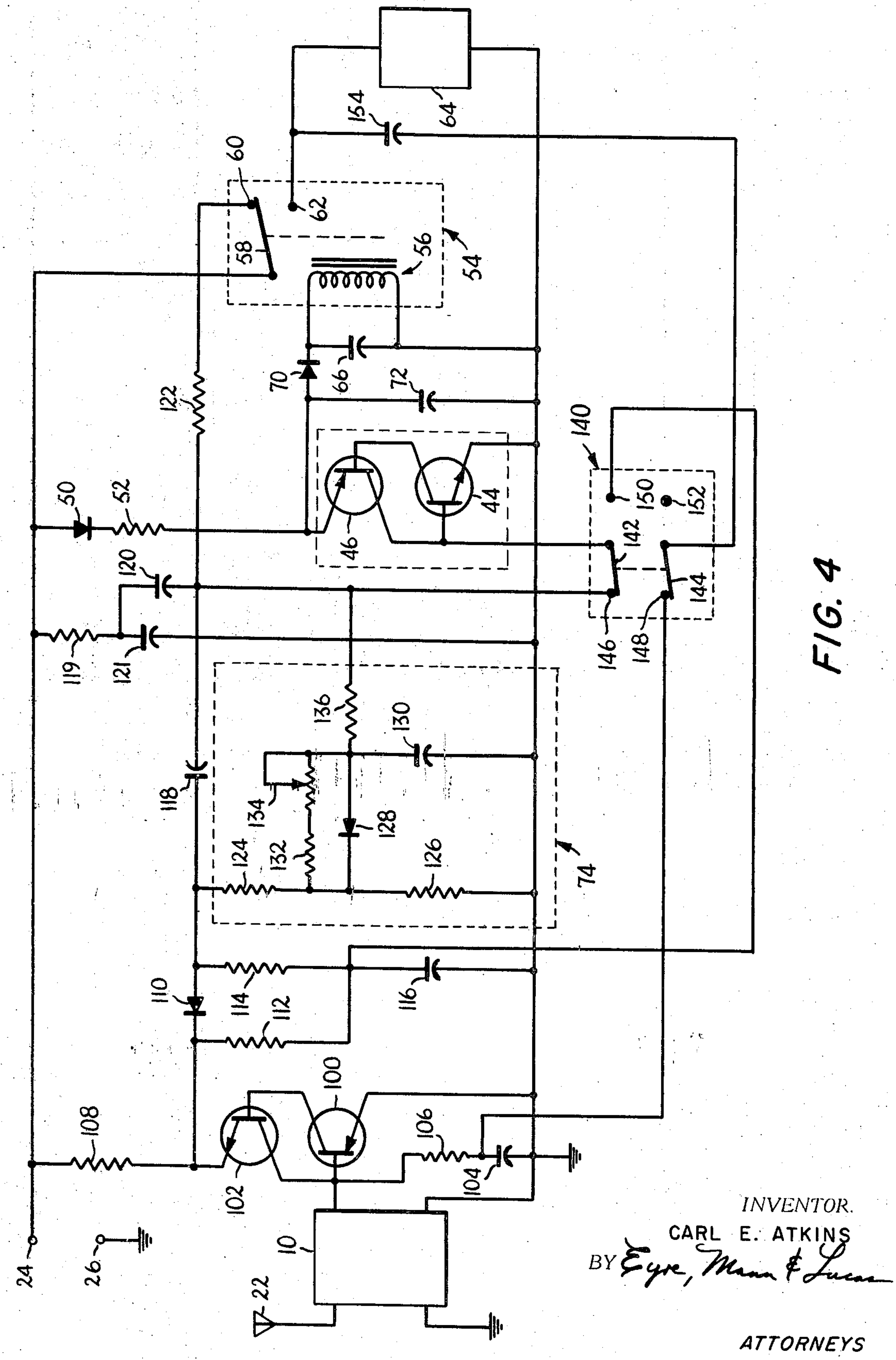
FIG. 4 is a schematic drawing of a circuit constituting a third embodiment of the invention which incorporates a two-position switch for enabling adjustment of the circuit.

Referring now to FIG. 4, the various circuit elements therein have the same function as the correspondingly numbered elements in FIG. 1. Specifically, terminal 24 is connected to the anode of diode 50, the cathode of which is connected to the high side of resistor 52, which is connected on the low side to the emitter of transistor 46. Complementary transistors 44 and 46 are connected in the regenerative feedback configuration, and serve as a switch for controlling the flow of current to the winding 56 of electromagnetic relay 54. Winding 56 is connected across the switch formed by the transistor pair 44, 46 and is shunted when the transistor pair 44, 46 is conductive. Diode 70 is connected at its anode to the emitter of transistor 46 and at its cathode to the high side of winding 56. Capacitor 66 is connected across the winding 56 and, along with diode 70, is operative to maintain the required level of DC energizing current to winding 56 when the transistor pair 44, 46 is nonconductive and the winding 56 is not shunted. Noise filtering capacitor 72 is connected between the emitters of transistors 44 and 46. As in FIG. 1, armature 58 connects the terminal 24 to load 64 through contact 62 when winding 56 of relay 54 is energized. The complementary transistor pair 100, 102 is connected in the regenerative feedback configuration with the emitter of transistor 100 being connected to ground and the emitter of transistor 102 being connected through resistor 108 to terminal 24. Circuit 10, which may be of the type disclosed in copending application Ser. No. 695,708, provides negative pulses to the base of transistor 100 to overcome the positive bias provided by capacitor 104, one side of which is grounded and the other side of which is connected through resistor 106 to the base of transistor 100. Thus, the transistor pair 100, 102 is maintained normally conductive. The cathode of diode 110 is connected to the emitter of transistor 102 and resistors 112 and 114 are connected across diode 110. Capacitor 116 is connected from the junction of resistors 112 and 114 to ground. Capacitor 118 is connected from the anode of diode 110 to the base of transistor 44 and capacitor 120 is connected from the junction of resistor 119 and capacitor 121 to the base of transistor 44. Resistor 119 and capacitor 121 are connected in series between terminal 24 and ground. Resistor 122 is connected to one side of terminal 24 through contact 60 and armature 58 of relay 54 and on the other side to the base of transistor 44.

Timing circuit 74 includes two voltage dividing resistors 124 and 126 connected in series between the anode of diode 110 and ground. The cathode of diode 128 is connected to the junction of resistors 124 and 126 and the anode of diode 128 is connected to one terminal of capacitor 130. The other terminal of capacitor 130 is connected to ground. Fixed variable resistors 132 and 134, respectively, are connected across diode 128. Resistor 136 is connected from the junction of diode 128 and capacitor 130 to the base of transistor 44.

A switch 140 enables selection of the connections required for either circuit operation or circuit testing. Switch 140 is a double-pole, double-throw switch comprising ganged armatures 142 and 144 and contacts 146, 148, 150 and 152. When switch 140 is set for circuit operation, the base of transistor 44 is connected through armature 142 and contact 146 to the junction of capacitors 118 and 120 and to one side of resistor 136. Capacitor 154 is connected between the high side of load 64 through armature 144 and contact 148 to the high side of capacitor 104. When the switch 140 is set for circuit testing, capacitor 154 is disconnected from the circuit and a path is closed from the base of transistor 44 through armature 142, contact 150 and resistor 112 to the emitter of transistor 102, thereby bypassing the timing circuitry 74.

A preferred set of values for the various components of the circuit shown in FIG. 4 is as follows:

- Resistor 52 — 8,200 ohms
- Capacitor 66 — 15 microfarads
- Capacitor 72 — 0.01 microfarads
- Capacitor 104 — 0.15 microfarads
- Resistor 106 — 47,000 ohms
- Resistor 108 — 100,000 ohms
- Resistor 112 — 1 megohm
- Resistor 114 — 180,000 ohms
- Capacitor 116 — 0.033 microfarads
- Capacitor 118 — 0.018 microfarads
- Resistor 119 — 100,000 ohms
- Capacitor 120 — 330 picofarads
- Capacitor 121 — 0.01 microfarads
- Resistor 122 — 3.9 megohms
- Resistor 124 — 15,000 ohms
- Resistor 126 — 5,600 ohms
- Capacitor 130 — 80 microfarads
- Resistor 132 — 82,000 ohms
- Resistor 134 — 0 to 100,000 ohms
- Resistor 136 — 180,000 ohms
- Capacitor 154 — 0.01 microfarads
- Transistor 44 — 2N3567
- Transistor 46 — 2N4248
- Transistor 100 — 2N4248
- Transistor 102 — 2N3567

Figure 5:
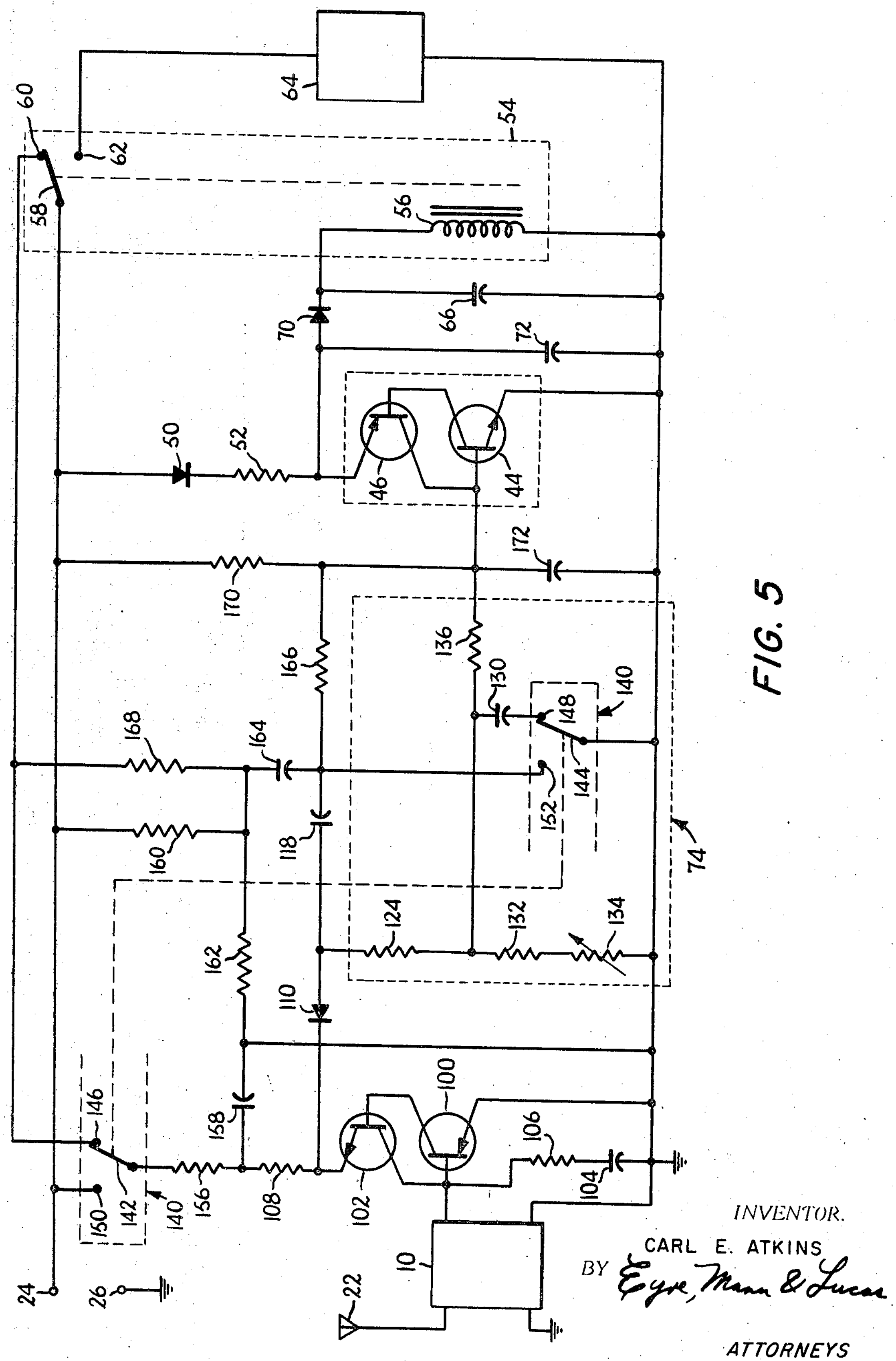
FIG. 5 is a schematic drawing of a circuit constituting a fourth embodiment of the invention which incorporates high-side filtering circuitry and a two-position switch for enabling adjustment of the circuit.

Referring now to FIG. 5, the various circuit elements therein have functions similar to those of the correspondingly numbered elements in FIG. 4. The connections of the two-positioned switch 140 shown in FIG. 4 have been altered, although the functions of the switch remain basically the same, i.e., in the first position (shown in FIG. 5), connections for complete circuit operation are established, while in the second position, circuit connections for testing are established. When switch 140 is set for circuit operation, armature 142 closes the load current path of transistor pair 100, 102 through contact 146 and through armature 58 and contact 60 of relay 54 to power input terminal 24, and armature 144 closes the charging current path for capacitor 130 through contact 148. Open contact 150 is connected to power input terminal 24. A filtering circuit comprising series-connected resistor 156 and capacitor 158 is connected between armature 142 and ground, with load-current limiting resistor 108 connected to the junction of resistor 156 and capacitor 158. A voltage divider comprising series-connected resistors 160 and 162 is connected between the power line and ground, their junction being connected through capacitor 164 and resistor 166 to the base of transistor 44 in order to provide one component of the firing signal to the transistor pair 44, 46. Open contact 152 of switch 140 is connected to the junction of capacitor 164 and resistor 166. Resistor 168 is connected between the junction of voltage-dividing resistors 160 and 162 and the interconnected contacts 60 and 146 of relay 54 and manual switch 140, respectively, and provides a second component of the firing signal to the base of transistor 44. Resistor 170 and capacitor 172 are connected in series between the power line and ground, with resistors 136 and 166 and the base electrode of transistor 44 being connected to their junction. A third component of the aforementioned firing signal is provided through resistor 170, while capacitors 172 and 72 filter transients to ground in order to prevent spurious firing of the transistor pair 44, 46.

Timing circuit 74 includes fixed resistors 124 and 132 and variable resistor 134 connected in series between the anode of diode 110 and ground. Capacitor 130 is connected between the high side of resistor 132 and ground when switch 140 is in the operational position. Resistor 136 is connected between the high side of capacitor 130 and the base of transistor 44.

The load-controlling relay 54, when deenergized, connects the power line through armature 58 and contact 60 to the high side of resistor 168 and to contact 146 of switch 140. When energized, relay 54 opens the aforementioned connections and energizes the load 64. Winding 56 is connected to the transistor pair 44, 46 by diode 70 and capacitor 66 in the same manner as in FIG. 4.

A preferred set of values for the various components of the circuit shown in FIG. 5 is the same as for FIG. 4, with the following exceptions and additions:

- Capacitor 66 — 16 microfarads
- Capacitor 72 — 0.001 microfarads
- Capacitor 104 — 0.1 microfarads
- Capacitor 118 — 0.068 microfarads
- Resistor 124 — 68,000 ohms
- Resistor 132 — 47,000 ohms
- Resistor 134 — 0—50,000 ohms
- Resistor 156 — 22,000 ohms
- Capacitor 158 — 0.01 microfarads
- Resistor 160 — 560,000 ohms Resistor 162 — 100,000 ohms
Capacitor 164 — 0.0047 microfarads
Resistor 166 — 56,000 ohms
Resistor 168 — 1 megohm
Resistor 170 — 10 megohms
Capacitor 172 — 0.0047 microfarads The operation of the circuit of FIG. 1 is as follows: absent any energizing signal from circuit 10, armature 16 and contact 18 will close a path from the terminal 24 through diode 50, resistor 52 and transistor pair 44, 46 to ground. The switch formed by transistor pair 44, 46 is normally conductive, allowing current to flow from ground to terminal 24 during the negative half-cycle of the applied AC power. Oscillator circuit 30 provides negative pulses which are transmitted through capacitor 42 to the base of transistor 44 to bias the transistor pair 44, 46 conductive. The magnitude of the output pulses of oscillator 30 is almost completely independent of line voltage.

So long as transistor pair 44, 46 remains conductive, energizing current will be shunted past winding 56 of relay 54 during the negative half-cycles of the applied AC power. During the positive half-cycles, diodes 50 and 70 prevent any current flow through winding 56. Thus, relay 54 will remain deenergized, causing load 64 to remain deenergized as well.

Diode 50 serves the additional function of preventing leakage current from flowing across the emitter-collector junction of transistor 46 during positive half-cycles. If not prevented, this leakage current would flow across the base-emitter junction of transistor 46 and thus alter the bias of the transistor pair 44, 46 derived from the bias circuitry and the timing circuitry. In addition, diode 50 halves the duty cycle of resistor 52, thereby reducing the heat generated by that resistor.

When winding 14 of relay 12 is energized from a signal of circuit 10, armature 16 and contact 20 close a current path from terminal 24 to the timing circuit 74. Neon tube 78 will break down during both the positive and negative half-cycles so as to provide a visual indication that charging of the timing circuit is taking place. Charging current will flow on the positive half-cycles through resistor 82 and diode 84 to capacitor 90. The amount of voltage which will develop across capacitor 90 as a result of the charging current is controlled by the value of resistor 86.

When the capacitor has accumulated sufficient charge to overcome the negative pulses generated by oscillator 30 and fed to the transistor pair 44, 46 through capacitor 42, the transistor pair will become nonconductive. However, as long as armature 16 and contact 20 of relay 12 close the current path to timing circuit 74, the cathode of diode 50 is no longer at line voltage and no energizing current will flow through the winding 56 of relay 54.

When the energizing signal is removed from winding 14 of relay 12, armature 16 will again move against contact 18, thus breaking the charging current path through contact 20 and putting the cathode of diode 50 back on line voltage. The transistor pair 44, 46 will remain nonconductive until the charge on capacitor 90 decreases to a level at which it will no longer overcome the negative pulses from oscillator 30. During this interval, energizing current flows through winding 56 of relay 54. Capacitor 66 charges during the negative half cycles of the applied AC power, and maintains the current through winding 56 above the energizing level by discharging through the winding during the positive half-cycles. Thus, after about a half-second delay introduced by the initial charging of capacitor 66, a current path is closed from terminal 24 through armature 16, contact 18, conductor 48, armature 58 and contact 62 through load 64 to ground. This current path will remain closed until capacitor 90 has sufficiently discharged through resistor 86 to permit the transistor pair 44, 46 to be rendered conductive by the negative pulses from oscillator 30.

It will be noted that the priming time of timing circuit 74 will be controlled by the magnitude of resistors 82 and 86. Priming time is the amount of time required for sufficient charge to accumulate on capacitor 90 to overcome the pulses generated by oscillator 30, and thereby render transistor pair 44, 46 nonconductive for the desired time interval.

The period of time for which the transistor pair will be rendered nonconductive is maintained at a constant value regardless of the period of time during which the charging current path is closed. The Zener breakdown voltage of the base-emitter junction of transistor 44 determines the upper limit of the voltage across capacitor 90, thus limiting the amount of charge which may be stored by capacitor 90.

The function of capacitor 76 is to cause a decrease in the magnitude of the oscillator pulses when armature 58 and contact 62 of relay 54 close the current path to the load, thereby requiring capacitor 90 to discharge more completely in order to render the transistor pair 44, 46 conductive.

The operation of the circuit shown in FIG. 2 is as follows: line voltage is applied through terminal 24, armature 16, contact 18, conductor 48, armature 58, and contact 60 to the high side of resistor 94 to provide the signal for maintaining the transistor pair 44, 46 conductive. So long as no energization signal is applied to winding 14 of relay 12, armature 16 will close a path from terminal 24 through contact 18 to the high side of resistor 98, in effect removing that resistor from the circuit since its low side is also connected to terminal 24. Similarly, resistor 96 has line potential applied to both of its terminals when both relays 12 and 54 are deenergized and is also effectively removed from the circuit. As in FIG. 1, winding 56 of relay 54 is shunted during the negative half-cycles of the applied AC power, with diodes 50 and 70 again serving to block energization current during the positive half-cycles. Diode 50 also prevents leakage current from altering the bias on the transistor pair 44, 46 as in FIG. 1. When winding 14 of relay 12 is energized, armature 16 closes a charging path from terminal 24 through contact 20 to timing circuit 74. Charging current will now flow through diode 84 and resistor 82 to capacitor 90. During charging, resistor 98 is connected in parallel with resistor 96 between terminal 24 and the high side of resistor 94, resulting in a slightly less negative signal at the base of transistor 44. This less negative signal and the rapidly increasing positive voltage across capacitor 90 cause transistor pair 44, 46 to become nonconductive early in the charging period. Energizing current now flows through the winding 56 of relay 54, thereby causing armature 58 to move against contact 62. However, during the remainder of the charging period, resistor 98 is connected in series with the load. Therefore, if the load is a lamp, resistor 98 will limit current flow and prevent the lamp from becoming incandescent. At the end of the charging period, armature 16 moves against contact 18, thereby removing resistor 98 from the load current path. A further decrease in the signal at the base of transistor 44 will also result, since resistor 98 is no longer connected in parallel with resistor 96. Capacitor 90 must now reach a lower voltage than would otherwise be necessary to result in a net voltage at the base of transistor 44 sufficient to render transistor pair 44, 46 conductive again.

FIG. 3 illustrates a timing circuit 74 for use in the circuits of FIG. 1 or FIG. 2. The purpose of this circuit is to stabilize the value of the period of priming time. This is accomplished by employing a neon tube 78 to provide undegraded regulation of the voltage applied to anode of diode 84 and by providing separate current paths for rapid charging and variable slow discharging of capacitor 90. The rapid charging path is through diodes 84 and 92 to capacitor 90. The slow discharging path is from the high side of capacitor 90 through fixed resistor 82 and variable resistor 86 to the low side of capacitor 90.

The operation of the circuit shown in FIG. 4 is as follows: When switch 140 is in the operational position, both transistor pairs 100, 102 and 44, 46 are conductive. Negative pulses from circuit 10 of sufficient amplitude to overcome the bias provided by capacitor 104 maintain the transistor pair 100, 102 is normally conductive. Transistor pair 44, 46 is normally maintained conductive by a positive firing signal having components passing through resistor 119 and capacitor 120 and through resistor 122. Therefore, in the no-signal condition, the charging path of the timing circuit 74 is shunted through transistor pair 100, 102 and the winding 56 of relay 54 is shunted by the transistor pair 44, 46. When a signal is detected by antenna 22, the magnitude of the negative pulses generated by circuit 10 is reduced sufficiently to overcome the positive DC voltage on capacitor 104 and transistor pair 100, 102 becomes nonconductive. The charging path through diode 110, resistor 124 and diode 128 to capacitor 130 is thus no longer shunted. During and after the charging period and while transistor pair 100, 102 is still conductive, normally conductive transistor pair 44, 46 is maintained conductive by an increased firing signal. The increase in the magnitude of the firing signal is due to charging of capacitor 118 to approximately the voltage which appears across resistor 124 during the negative half-cycles of the applied power, and the subsequent discharging of capacitor 118 through resistor 136, diode 128 and resistor 124 just prior to and during the positive half-cycles. Thus, the negative signal from the increasingly charged capacitor 130 is overcome during the charging period. While conductive, transistor pair 44, 46 shunts the current flowing through diode 50 and resistor 52 to ground, thus bypassing winding 56 of relay 54. As in the circuit shown in FIG. 1, diode 50 prevents leakage current from altering the bias on transistor pair 44, 46 during negative half-cycles of applied power, and reduces the heat generated by current flow through resistor 52.

When antenna 22 no longer detects a signal, the magnitude of the negative pulses being applied to transistor pair 100, 102 is increased and the transistor pair again becomes conductive. The magnitude of the firing signal is reduced, since the component of that signal which was provided by the charging and discharging of capacitor 118 is now absent. The accumulated voltage on capacitor 130 is applied to the base of transistor 44 through resistor 136, contact 146 and armature 142 of switch 140, thus overcoming the normal firing signal and rendering the transistor pair 44, 46 nonconductive. During the period of nonconductivity, resistor 119 and capacitor 121 prevent line noise from firing the transistor pair 44, 46. Energizing current will flow during the positive half-cycles of the applied power from terminal 24 through diode 50, resistor 52 and diode 70 through winding 56 of relay 54, thus causing armature 58 to close a current path from terminal 24 through contact 62 to load 64 after a time delay introduced by the initial charging of capacitor 66. Also, the current path from terminal 24 through contact 60 and armature 58 of relay 54 to the high side of resistor 122 is opened, reducing the firing signal below its normal level and thereby necessitating more complete discharge of capacitor 130 to permit the reduced firing signal to render transistor pair 44, 46 conductive again. When capacitor 130 discharges sufficiently through resistors 126, 132 and 134 and transistor pair 44, 46 is restored to its normally conductive state by the reduced firing signal, the winding 56 of relay 54 will be shunted as before and armature 58 of relay 54 will move against contact 60, thus opening the current path through contact 62 to load 64.

Looking now at the timing circuitry 74, it may be seen that charging of capacitor 130 is accomplished by negative half-waves passing through diode 110. Priming time, i.e., the period of time necessary to raise the voltage across capacitor 130 to the level necessary to render transistor pair 44, 46 nonconductive for the required length of time, is determined by the values of resistor 124 and capacitor 130. The minimum priming time is preferably on the order of 2 seconds, which is in most instances sufficient to prevent flushing by passersby who might cause a spurious decrease in the pulse output of circuit 10. The duration of the discharge time is determined by the values of resistors 126, 132 and 134, and capacitor 130.

Capacitor 154, connected between the high side of load 64 and the high side of capacitor 104 through armature 144 and contact 148 of switch 140, provides a strong negative signal to the base of transistor 100 when the load is energized. Transistor pair 100, 102 is thus maintained conductive during energization of load 64 regardless of the pulse input from circuit 10. Energization of the timing circuit and charging of capacitor 130 during energization of the load is thus prevented, thereby preventing repeated and unnecessary energization of the load.

When switch 140 is in the testing position, adjustment of the sensitivity of the circuit 10 may be made. The timing circuit is now bypassed entirely so that transistor pair 44, 46 will be rendered nonconductive almost simultaneously with transistor pair 100, 102. When transistor pair 100, 102 is conductive, transistor pair 44, 46 is maintained conductive by a positive signal derived from the low side of resistor 112 and fed to the base of transistor 44 through contact 150 and armature 142 of switch 140. Also, capacitor 154 is no longer connected to the bias circuitry of transistor pair 100, 102. When the output of circuit 10 renders transistor pair 100, 102 nonconductive, capacitor 116 charges rapidly through diode 110 and resistor 114. The negative voltage across capacitor 116 is applied to the base of transistor 44 through contact 150 and armature 142, thereby rendering the transistor pair 44, 46 nonconductive substantially instantaneously.

The operation of the circuit of FIG. 5 is as follows: when manual switch 140 is in the operational position, i.e., when armatures 142 and 144 are in contact with contacts 146 and 148, respectively, and antenna 22 does not sense a signal, both of the transistor pairs 100, 102 and 44, 46 are conductive. Transistor pair 44, 46 is normally maintained conductive in the same manner as in the circuit of FIG. 4. Transistor pair 44, 46 is normally maintained conductive by a firing signal having components passing through resistor 170, through resistor 168, capacitor 164, and resistor 166, and through resistor 160, capacitor 164 and resistor 166. Therefore, in the no-signal condition, the charging path of the timing circuit 74 is shunted through transistor pair 100, 102 and the winding 56 of relay 54 is shunted by the transistor pair 44, 46.

When a signal is detected by antenna 22, thereby reducing the magnitude of the input pulses to the gate electrode of transistor pair 100, 102, this transistor pair becomes nonconductive and allows charging current to flow through diode 110 and resistor 124 to capacitor 130 in timing circuit 74. During and after the charging of capacitor 130 and while transistor pair 100, 102 is still nonconductive, capacitor 118 adds a fourth component to the aforementioned firing signal by charging to approximately the voltage across resistor 124 during the negative half-cycles of applied power and then discharging through resistors 166, 136 and 124 just prior to and during the positive half-cycles. Thus, the negative signal from capacitor 130 is overcome by an increased firing signal during the charging period.

When antenna 22 no longer detects a signal, the magnitude of the negative pulses generated by circuit 10 increases and renders transistor pair 100, 102 conductive again by overcoming the bias voltage on capacitor 104. The charged capacitor 130 in the timing circuit 74 now renders transistor pair 44, 46 nonconductive by overcoming the aforementioned firing signal, which is now reduced to its normal level by the removal of the component produced by the charging and discharging of capacitor 118. The winding 56 of relay 54 is now energized, causing armature 58 to move against contact 62. Thus, the high side of resistor 168 is disconnected from the power source, resulting in a further decrease in the firing signal to the gate electrode of transistor pair 44, 46. Load 64 is energized during the period of closure of armature 58 and contact 62, this period being variable by varying resistor 134. Also, the load current path of transistor pair 100, 102 is disconnected from the power input terminal 24 so as to prevent energization of the timing circuit 74 during the period of load energization, thereby preventing repeated and undesirable energization of the load.

Capacitor 13 0 discharges through resistors 132 and 134, and when the voltage across capacitor 130 falls to a level at which it can no longer overcome the reduced firing signal, transistor pair 44, 46 again become conductive, thereby shunting winding 56 of relay 54 and allowing armature 58 to move against contact 60. Thus, the load 64 is deenergized, the firing signal is increased to its normal level, and the load current path of transistor pair 100, 102 is again connected to power input terminal 24.

Accidental firing of either transistor pair of this circuit is prevented by several filtering circuits. Resistor 156 and capacitor 158 filter transients from the power line so they cannot trigger the transistor pair 100, 102, thus preventing spurious energization of timing circuit 74. Also, capacitors 172 and 72 filter transients from the power line so as to prevent firing of transistor pair 44, 46, thereby preventing spurious energization of the load 64.

When switch 140 is in the testing position, i.e., when armatures 142 and 144 are in contact with contacts 150 and 152, respectively, the timing capacitor 130 is disconnected from the timing circuit and the load current path of transistor pair 100, 102 is connected directly to the power input terminal 24, rather than being connected through armature 58 and contact 60 of relay 54. Thus, when transistor pair 100, 102 is rendered nonconductive, the transistor pair 44, 46 is rendered nonconductive substantially instantaneously by the firing signal consisting solely of the component passing through resistor 170, the other components being shunted to ground through contact 152 and armature 144 of manual switch 140. Sensitivity tests of circuit 10 are thus made possible.

It will be understood that it is intended to cover all changes and modifications of the preferred embodiment of the invention, herein chosen for the purpose of illustration, which do not depart from the spirit and scope of the invention.

I claim:

1. A control circuit comprising:

1. first and second power input terminals through which power is applied to said control circuit;
2. first switching means electrically connected to said power input terminals and operative in response to a predetermined input signal to control a first current path comprising said first switching means;
3. second switching means having anode, cathode and gate electrodes, and being operative in response to a signal applied to said gate electrode to control a second current path comprising said second switching means;
4. bias circuit means electrically connected to and operative to provide a firing signal to said gate electrode of said second switching means;
5. timing circuit means electrically connected to said first switching means and to said gate electrode of said second switching means and including capacitance means, a charging current path for said capacitance means, and a discharging current path for said capacitance means; and
6. third switching means controlled by current divertible from said second current path by said second switching means and operative to control energization and deenergization of a load, and further operative to decrease said firing signal to said gate electrode of said second switching means simultaneously with energization of a load, wherein when said power input terminals are connected to a source of alternating current power and said first switching means is provided with said predetermined input signal, said capacitance means of said timing circuit means is charged, and when said predetermined input is no longer provided to said first switching means, said capacitance means discharges and provides to said gate electrode of said second switching means a signal operative to maintain said second current path open and thereby divert controlling current to said third switching means for a predetermined variable portion of the discharging period.

2. A control circuit according to claim 1 wherein the firing signal provided by said bias circuit means is increased above its normal level during charging of said capacitance means of said timing circuit means.

3. A control circuit according to claim 1 further comprising manual switching means selectively operable (1) in a first position, to close a first connection to said timing circuit means so as to enable said control circuit to perform the full sequence of events of normal circuit operation, and (2) in a second position, to open said first connection to said timing circuit means and to close a second connection bypassing at least a portion of said timing circuit means so as to enable said second switching means to be rendered nonconductive without any substantial time delay after said predetermined input signal has been provided to said first switching means.

4. A control circuit according to claim 3 wherein said manual switching means, when in said second position, closes a third connection directly between said first current path and said first power input terminal.

5. A control circuit according to claim 3 wherein said manual switching means, when in said second position, shunts a portion of the normal firing signal to ground.

6. A control circuit according to claim 1 wherein:

1. said charging current path for said capacitance means in said timing circuit comprises first resistance means having first and second terminals, and rectification means having first and second terminals, said first terminal of said rectification means being connected to said second terminal of said resistance means, and said second terminal of said rectification means being connected to the high side of said capacitance means;
2. said discharging current path for said capacitance means in said timing circuit comprises a variable resistance means connected in parallel with said capacitance means; and
3. a gas filled tube and a second resistance means are connected in series from the low side of said capacitance means to the first terminal of said first resistance means.

7. A control circuit according to claim 1 wherein:

1. said charging current path for said capacitance means in said timing circuit comprises, in series, first resistance means, first rectification means having first and second terminals, and second resistance means having first and second terminals, said first terminal of said second resistance means being connected to the second terminal of said first rectification means, and said second terminal of said first resistance means being connected to the high side of said capacitance means;
2. said discharging current path for said capacitance means in said timing circuit comprises second rectification means connected in parallel with said second resistance means, and variable resistance means connected from the second terminal of said first rectification means to the low side of said capacitance means, unlike terminals of said first and second rectification means being directly connected to each other; and
3. a gas filled tube is connected between the low side of said capacitance means and the first terminal of said first rectification means.

8. A control circuit according to claim 1 wherein said charging current path for said capacitor in said timing circuit provides a relatively short charging time, and said discharging current path provides a relatively long discharging time.

9. A control circuit according to claim 1 wherein:

1. said charging path for said capacitance means in said timing circuit comprises first resistance means, first rectification means, second resistance means, and second rectification means connected in series from said power input terminal to the high side of said capacitance means; and
2. said discharging path for said capacitance means in said timing circuit comprises a variable resistance means, and a third and a fourth resistance means connected in series between the high and the low side of said capacitance means.

10. A control circuit according to claim 1 wherein said third switching means comprises:

1. electromagnetic relay means for energizing and deenergizing a load and comprising a winding, an armature, and first and second contacts, said winding being shunted when said second switching means is conductive;
2. rectifying means connected between one terminal of said winding and the cathode of said second switching means; and
3. capacitance means connected in parallel with said winding.

11. A control circuit according to claim 10 wherein said firing signal is decreased below its normal level for any period during which said electromagnetic relay means is energized.

12. A control circuit according to claim 1 wherein said bias circuit means comprises low frequency relaxation oscillator means operative to produce a pulse train which is transmitted to said gate electrode of said second switching means and which maintains said second switching means conductive in the absence of a signal from said timing circuit means.

13. A control circuit according to claim 1 wherein said bias circuit means comprises first, second and third resistance means, said first resistance means being connected between said first power input terminal and said gate electrode of said second switching means before said predetermined input signal is provided to said first switching means, said second and third resistance means being connected in parallel with each other and in series with said first resistance means between said first power input terminal and said gate electrode during charging of said capacitance means of said timing circuit means, and said second and first resistance means being connected in series between said first power input terminal and said gate electrode during that part of the discharge period of said capacitance means during which said second switching means in nonconductive.

14. A control circuit according to claim 1 wherein said bias circuit means comprises:

1. first capacitance means connected across the input and output terminals of said timing circuit means;
2. filtering circuit means connected to said first power input terminal;
3. second capacitance means connected between said filtering circuit means and the output terminal of said timing circuit; and
4. resistance means connected between said first power input terminal and the output terminal of said timing circuit means only when said second switching means is conductive.

15. A control circuit according to claim 1 further including manually operated switching means for selectively interconnecting said first switching means to said gate electrode of said second switching means (1) in a first position, through said timing circuit means, and (2) in a second position, through alternate circuit means operative to render said second switching means nonconductive without any substantial time delay after said predetermined input signal has been provided to said first switching means.

16. A control circuit according to claim 10 further including disabling circuit means operative to maintain said first switching means conductive when said electromagnetic relay means is energized.

17. A control circuit according to claim 16 further including manually operated switching means for selectively connecting and disconnecting said disabling circuit means to said first switching means.

UNITED STATES PATENT OFFICE

CERTIFICATE OF CORRECTION

Patent No. 3,564,346 Dated February 16, 1971

Inventor(s) Carl E. Atkins

It is certified that error appears in the above-identified patent and that said Letters Patent are hereby corrected as shown below:

Assignee should read --Wagner Electric Corporation--

Signed and sealed this 17th day of August 1971.

(SEAL)
Attest:

EDWARD M.FLETCHER,JR.
Attesting Officer

WILLIAM E. SCHUYLER,
Commissioner of Paten